(12) United States Patent
Picon et al.

(10) Patent No.: US 9,324,018 B2
(45) Date of Patent: Apr. 26, 2016

(54) METHOD OF PRODUCING RADIO-FREQUENCY IDENTIFICATION ELEMENTS AND RADIO-FREQUENCY IDENTIFICATION ELEMENTS CAPABLE OF BEING OBTAINED BY SUCH A METHOD

(75) Inventors: Mathieu Picon, Prades le Rez (FR); Laurent Delaby, Colomiers (FR); Brice Sorli, Montagnac (FR); Frédérique Pascal-Delannoy, Montpellier (FR); Alain Foucaran, Mauguio (FR)

(73) Assignee: TAGEOS, Clapiers (FR)

( * ) Notice: Subject to any disclaimer, the term of this patent is extended or adjusted under 35 U.S.C. 154(b) by 429 days.

(21) Appl. No.: 12/864,220

(22) PCT Filed: Jan. 22, 2009

(86) PCT No.: PCT/FR2009/000069
§ 371 (c)(1),
(2), (4) Date: Oct. 6, 2010

(87) PCT Pub. No.: WO2009/112684
PCT Pub. Date: Sep. 17, 2009

(65) Prior Publication Data
US 2011/0017831 A1    Jan. 27, 2011

(30) Foreign Application Priority Data
Jan. 23, 2008    (FR) ...................................... 08 50418

(51) Int. Cl.
*G06K 19/06*    (2006.01)
*G06K 19/077*   (2006.01)

(52) U.S. Cl.
CPC ................................. *G06K 19/07749* (2013.01)

(58) Field of Classification Search
USPC ................................................. 235/487, 492
See application file for complete search history.

(56) References Cited

U.S. PATENT DOCUMENTS

| 2006/0017571 A1* | 1/2006 | Arnold et al. ............... 340/572.7 |
| 2006/0124738 A1* | 6/2006 | Wang et al. ................... 235/385 |

(Continued)

FOREIGN PATENT DOCUMENTS

| DE | 299 23 432 U1 | 10/2000 |
| EP | 1 035 504 A1  | 9/2000  |
| EP | 1 801 739 A1  | 6/2007  |

OTHER PUBLICATIONS

Bishop, Charles A., C.A. Bishop Consulting Ltd. Long Meadows, N. Yorks, UK "Possible Future Trends for Aluminium Metallizing", 2004 Society of Vacuum Coaters 505/856-7188, 47th Annual Technical Conference Proceedings (2004) ISSN 0737-5921, p. 1-6.

(Continued)

*Primary Examiner* — Rafferty Kelly
(74) *Attorney, Agent, or Firm* — Arent Fox LLP

(57) ABSTRACT

The invention relates to a method of producing, by vacuum deposition of at least one conducting material on a supporting means, radiofrequency identification elements as well as to radiofrequency identification elements that can be obtained by implementing such a method. The present invention is directed to a method of production allowing low-cost fabrication of radiofrequency identification elements which have high-performance and are also discrete. To achieve this, the invention provides for the use of a vacuum deposition technique for producing the antenna on a support means previously covered with a bonding coat, such as a layer of varnish. More precisely, the subject of the invention is a method of producing at least one radiofrequency identification element consisting in producing at least one antenna (8) on a support means (2) by vacuum deposition of at least one conducting material (10) on a receiving surface (2a) of the support means (2), characterized in that at least a part of the receiving surface (2a) is previously covered with a bonding coat (6).

26 Claims, 3 Drawing Sheets

(56) References Cited

U.S. PATENT DOCUMENTS

2006/0187056 A1* 8/2006 Carmi et al. ............... 340/572.7
2007/0138303 A1* 6/2007 Asakura et al. ............ 235/492
2007/0238019 A1* 10/2007 Laurent et al. ............ 429/163

OTHER PUBLICATIONS

Rainer Ludwig, et al., "Vacuum Web Coating—State of the Art and Potential for Electronics", Proceedings of the IEEE, vol., 93, No. 8, Aug. 2005. p. 1483-1490.

* cited by examiner

Figure 1:
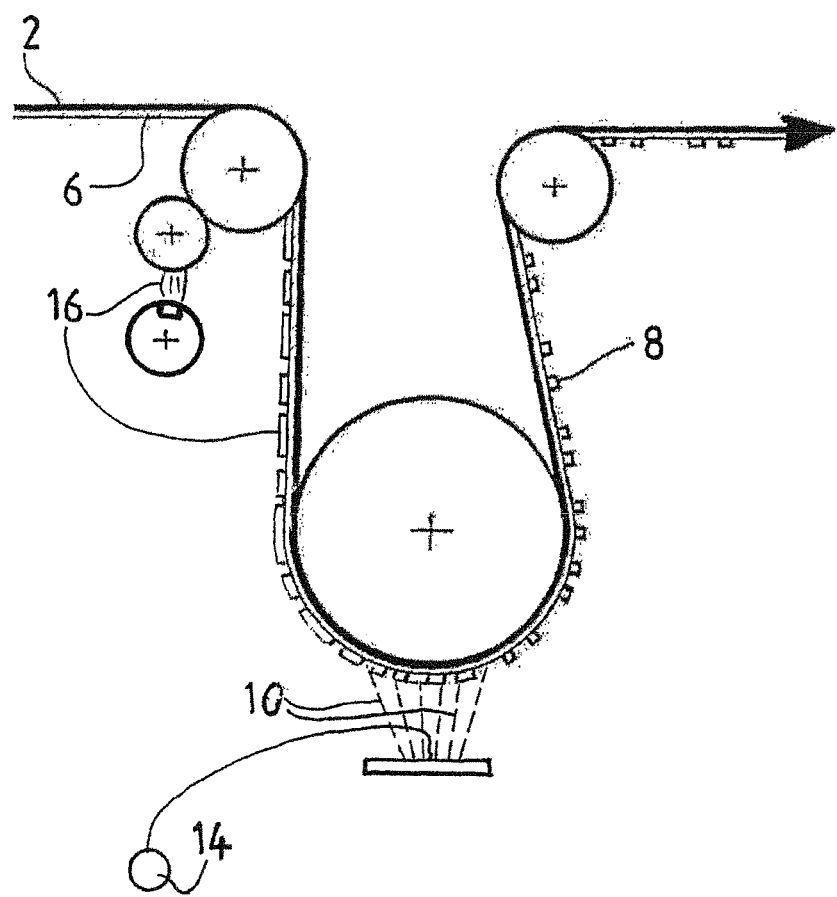

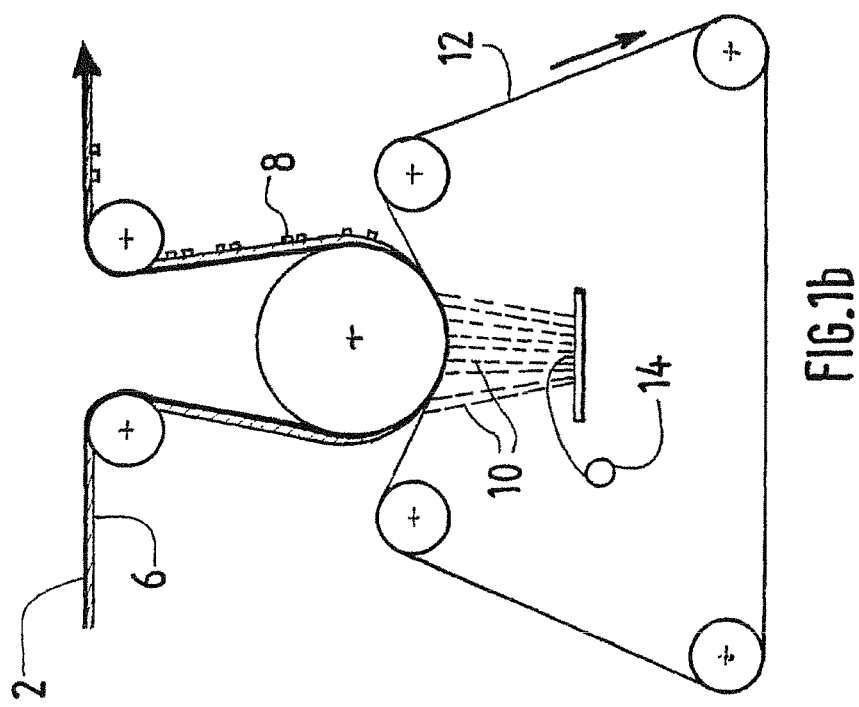
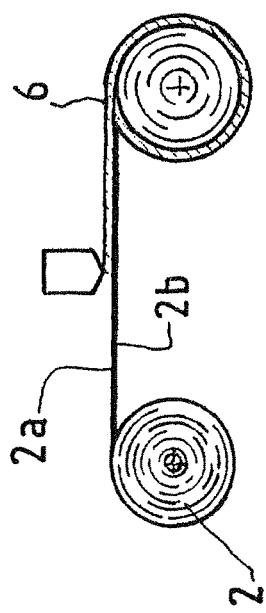
FIG.1b
FIG.1a

METHOD OF PRODUCING RADIO-FREQUENCY IDENTIFICATION ELEMENTS AND RADIO-FREQUENCY IDENTIFICATION ELEMENTS CAPABLE OF BEING OBTAINED BY SUCH A METHOD

CROSS-REFERENCE TO RELATED APPLICATION

This application is a National Stage entry of International Application No. PCT/FR2009/000069 filed Jan. 22, 2009, which claims priority to French Patent Application No. 0850418 filed Jan. 23, 2008. The disclosure of the prior applications are hereby incorporated in their entirety by reference.

The invention relates to a method of producing, by vacuum deposition of at least one conducting material on a support means, radio-frequency identification elements as well as to radio-frequency identification elements that can be obtained by implementing such a method.

The present invention concerns the technical field of radio-frequency identification elements for identifying objects, animals or persons.

More particularly, the invention relates to a method of producing radio-frequency labels, tickets and contactless cards that can be used as identification, authentication, access, payment, monitoring or traceability means.

Various solutions for producing radio-frequency transponders on a support means, such as a label, ticket or card, are known from the prior art. Previously, these radio-frequency transponders were produced on a plastic support, to form a so-called inlay, then bonded to a support means. Nevertheless, this structure, and more particularly the presence of the inlay, has drawbacks in terms of production cost and reliability and gives rise to excess thickness compared with conventional bar-code labels.

Solutions have therefore appeared for dispensing with the use of this intermediate layer on which the antenna is produced. Thus French patent application no FR 2 855 637 describes a method of producing contactless tickets, from paper packaged in a roll, in which conductive ink is printed by screen printing directly on the support in order to produce the radio antenna. In this method, the conductive ink is printed directly on the back of the printable surface of the paper, which makes it possible to dispense with the use of an inlay. Nevertheless, this method is not totally satisfactory since conduction inks require drying time after deposition. A drying step or a step of protection of the antenna is then necessary for protecting the printable surface of the paper when it is coiled and preventing the conductive ink, still wet, from soiling it. Moreover, these conductive inks have a low quality to price ratio since they are either expensive or not very conductive.

Moreover, European patent n° EP 1 035 504 discloses a radio-frequency label on which the antenna part is directly produced on the back of a printable support means, without an intermediate layer, and then adding the chip to this support means. However, such fabrication is also a problem since adhesion between the antenna and the back of the support means is not optimum when the deposition is carried out under vacuum. The conductivity of such a transporter can also be improved. In addition, when the support is thermally sensitive, the deposition speed is limited by the temperature acceptable for the support means.

In addition, when the antenna is produced by conductive-ink printing, the drying time is also lengthy and a heating step, which would reduce this drying time, is tricky to implement since the support means is sensitive to high temperatures.

Moreover, the radio-frequency identification elements of the prior art are sometimes equipped with sensors for making measurements of physical parameters characteristic of the conditions of use of the object identified by the identification element (storage temperature, temperature variation during transport, humidity, presence of contaminating or dangerous substances, impacts, etc). Nevertheless, these sensors equipped with batteries for the regular recording of measurements are expensive. They are in addition finished products attached to the radio-frequency identification element, not directly produced on top, which increases the final production cost.

The present invention aims to overcome the drawbacks of the prior art by proposing a production method for producing, at low cost, radio-frequency identification elements that are both of high performance and discrete.

More particularly, the invention proposes to produce radio-frequency transponders of sufficient conductivity to guarantee optimum performance, while having good adhesion to the substrate and without requiring expensive drying conditions, so as to facilitate production thereof.

According to another aspect, the invention also makes provision for obtaining radio-frequency identification elements for improving the monitoring of products without being too expensive.

To do this, the present invention proposes using a vacuum deposition technique for forming the antenna on a support means previously covered with a bonding coat, such as a layer of varnish.

More precisely, the subject matter of the invention is a method of producing at least one radio-frequency identification element consisting of producing at least one antenna on a support means by vacuum deposition of at least one conducting material on a receiving surface of the support means, in which at least part of the receiving surface is, in a step prior to the deposition of the conducting material, covered with a bonding coat.

The term support means applies to any type of substrate, printable or not, such as paper, cardboard or optionally PET.

Moreover, the term bonding coat refers to a preparation of fluid or viscous consistency applicable by printing or vaporisation in a continuous layer on a support means and the thickness of which is small relative to the surface extent.

According to particular embodiments:
vacuum deposition is performed by thermal evaporation;
an oil is printed on the parts of the receiving surface covered with the bonding coat that are not intended to receive the conducting material;
the conducting material is deposited on the receiving surface covered with the bonding coat, through a screen-printing mask able to move in accordance with the movement of the support means;
the receiving surface is self-adhesive and protected by a scored protective layer forming the screen-printing mask;
said at least one conducting material is made from aluminium; at least one sensor is produced by successive deposits of thin films of at least one conductive material on at least part of the receiving surface of the support means covered with the bonding coat; and
at least one microbattery is produced by successive depositions of thin films of at least one conducting material on at least part of the receiving surface of the support means covered with the bonding coat.

According to another aspect, the invention concerns a radio-frequency identification element capable of being obtained by the method according to the invention, comprising a support means and at least one antenna made from a conducting material, in which the support means comprises a receiving surface at least partially covered with a bonding coat on which the antenna is formed.

According to particular embodiments:

the support means is printable;

the bonding coat is a varnish;

the bonding coat is self-adhesive and covered with a cut protective layer constituting a screen-printing mask for the shape of the antenna;

the identification element also comprises at least one sensor having thin films of at least one conducting material formed on the receiving surface at least partially covered with the bonding coat;

the bonding coat has physical properties for interacting with the sensor; and the radio-frequency identification element also comprises at least one microbattery having thin films of at least one conducting material formed on the receiving surface at least partially covered with the bonding coat.

The invention also concerns the use of radio-frequency identification elements for certifying compliance with standards for packaging individual food or medical products.

The bonding coat in particular improves the properties of adhesion between the support means and the conducting material, which makes it possible to coil the support means immediately after the operation of depositing the conducting material, without requiring a drying step or protective means. Moreover, the bonding coat also protects the support means when the conducting material forming the antenna is deposited. In addition, the conductivity of the deposit of conducting material on the bonding coat is improved compared with the performance of the methods of the prior art.

The vacuum deposition of thin films of a conducting material on a bonding coat also makes it possible to obtain highly conductive deposits the thickness of which can be controlled. Thus it is possible to adapt the square resistance of the antennas and the thickness of the deposit according to the application, the performance sought and the use of the end product.

More particularly, the deposition of aluminium by thermal evaporation on a print medium covered with a varnish has particularly interesting results in terms of adhesion and conductivity.

The varnish makes it possible to obtain a particularly smooth deposition surface, which increases the conductivity of the deposit, protects the support thermally during the deposition phase, in particular by using special varnishes for thermal protection, and finally reduces the cost of the printing, which makes it possible to obtain an excellent performance/cost ratio.

In addition, the vacuum deposition of thin films of material makes it possible to produce sensors directly on the support means at least partially covered with the bonding coat, using the same method as that used for the production of the antennas. This is therefore a gain in terms of time and cost.

In addition, this method is less polluting than the methods of the prior art since it does not give rise to polluting scrap and the products comprises less polluting material. This is because the thin films of conductive material for producing the antenna are less thick and the conducting material, advantageously aluminium or copper, less polluting than the silver contained in the inks.

Figure 2B:
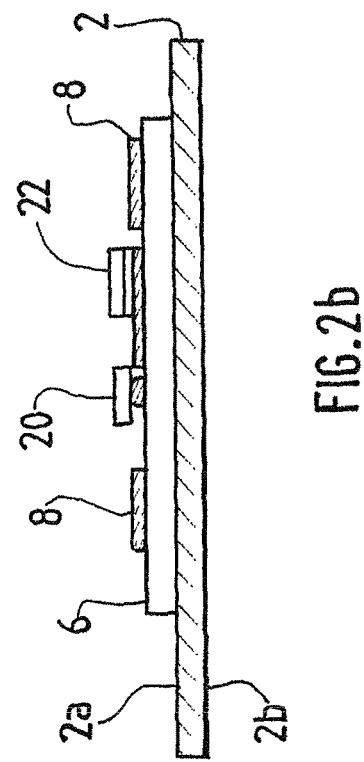
Figure 2A:
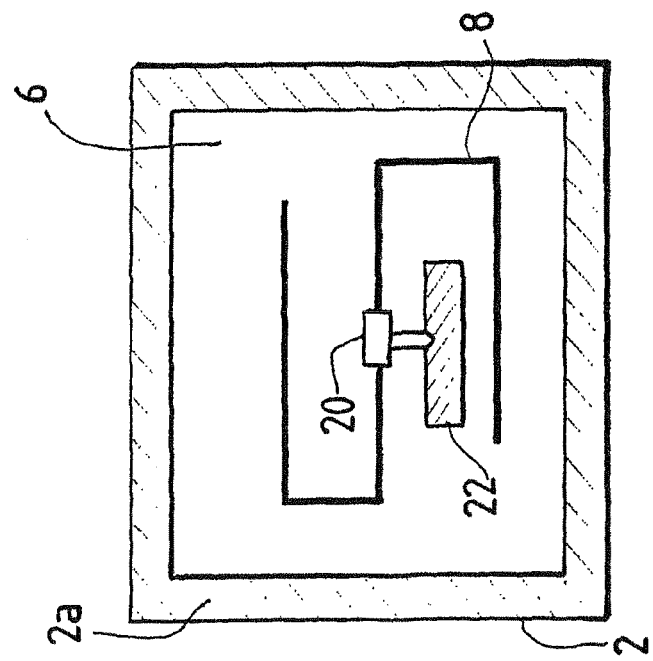

Other features and advantages of the invention will emerge from the following reading of a detailed example embodiment, with reference to the figures, which show respectively:

FIGS. 1a and 1b, two simplified diagrams of a first embodiment of the device for implementing the method according to the invention;

FIG. 1c, a simplified diagram of a second embodiment of a device for implementing the method according to the invention;

FIGS. 2a and 2b, respectively views in plan and in section of an example embodiment of a radio-frequency identification element according to the invention.

A device for implementing a method of producing radio-frequency identification elements according to the invention will now be described with reference to FIGS. 1a and 1b.

The radio-frequency identification element according to the invention is produced from a support means 2, advantageously packaged as a roll of paper 30 to 40 cm wide or more and several hundreds of meters long. The support means 2 is composed of a receiving surface 2a and a print surface 2b. Preferably these deposition 2a and print 2b surfaces are different and disposed respectively on each of the two faces of the support means 2.

Alternatively, the print support 2 can be PET, also previously packaged in a roll or pre-cut to the format of the radio-frequency identification elements to be produced.

The print support 2, the print surface 2b of which is optionally pre-printed, is intended for several printing techniques, including printing by thermal transfer, inkjet, flexographic printing, offset, etc.

A step of the method of producing radio-frequency identification elements 2 according to the invention consists of covering the receiving surface 2a of the support means 2 with a bonding coat 6. Advantageously, the bonding coat 6 is a standard varnish, for example a UV varnish of the UVL 1312 FLEXO U.V type from Rowat BV. However, the bonding coat 6 can also be a specific coat such as a coat intended for thermal protection, or an ink or any other coat having advantageous properties.

The bonding coat 6 is printed on the receiving surface 2a of the support means 2 by flexographic printing or any other suitable technique such as vaporisation. It can cover this receiving surface 2a completely or only partially.

The step of forming a radio-frequency antenna 8 on the receiving surface 2a of the support means 2 can then be implemented. To do this, a conducting material 10, such as aluminium, is deposited by vacuum thermal evaporation.

According to variant embodiments, the conducting material 10 may be copper, optionally deposited by cathodic sputtering, or any other combination of these embodiments.

It should be noted that the receiving surface 2a and the print surface 2b of the support means can be merged, for example if the antenna 8 is formed in the printed patterns. The bonding coat can then be deposited only on the surface intended to receive the antenna or antennas.

According to this embodiment, the formation of the radio-frequency antenna 8 is performed step by step. A screen-printing mask 12 then remains in fixed position with respect to the movement of the roll of paper forming the support means 2. The movement of this paper roll is moreover discontinuous and the evaporation of the conducting material 10 is achieved when the roll is stopped. The conducting material 10 is then deposited, in a continuous layer or in several thin films, on the receiving surface 2a of the support means 2, through the fixed screen-printing mask 12.

Alternatively, this masking method is replaced by a system using an electrical field attracting the conducting material 10 at precise points on the receiving surface 2a of the support means 2.

The formation of the antenna 8 can also be continuous. The screen-printing mask 12 is then movable and follows the movement of the support means 2. Thus, the device is supplied with conducting material 10 by means of a supply wire 14.

Advantageously, the receiving surface 2a of the support means 2 is self-adhesive and protected by a protective layer. In this case, the protective paper can have a cutout corresponding to the shape of the radio-frequency antenna 8 and thus constitute a movable screen-printing mask 12. The self-adhesive layer can constitute the bonding coat 6. Alternatively a varnish neutralising the self-adhesive can be printed or vaporised on the self-adhesive layer, through the openings in the protective layer, prior to the deposition of the conductive material.

FIG. 1c illustrates a second method of producing the antenna 8 on the support means 2. In this second embodiment, step by step or continuous, an oil 16 is printed on the receiving surface 2a of the support means 2, previously covered with the bonding coat 6, before the deposition of the conducting material 10 forming the antenna 8. It should be noted that, by virtue of the bonding coat 6, the oil 16 is not absorbed by the support means 2 and therefore remains on the surface. The oil 16 is printed only on the parts that are not intended to receive the conducting material 10 constituting the antenna 8. When the conducting material 10 is deposited, because of the heat released by the evaporation sources, the degassing of the oil 16 prevents the conducting material 10 from being deposited locally and forces it to be deposited on the areas not printed with oil 16, thus producing the pattern of the antenna 8.

According to this second embodiment, a thickness of conducting material between 250 nm and 1.5 μm, or even less, can be obtained with a speed of the support means ranging from 10 m/min to 50 m/min.

Once the radio-frequency antenna 8 has been formed on the receiving surface 2a of the support means 2 covered with the bonding coat 6, the join between the antenna 8 and an electronic chip 20 can be effected. This join can be achieved by thermocompression using "bumped" chips, that is to say where the terminals of the chip are produced by metal studs facilitating connection. These chips are taken from a very pure sawn silicon wafer and fixed by an anisotropic conductive adhesive. According to a variant, the chips used can be chips packaged in a "strap", that is to say on a small support with two areas covered with a conducting element, using an isotropic conductive glue. Alternatively, the chips can be produced by polymer printing.

Advantageously, the method of manufacturing radio-frequency identification elements also comprises a step of producing sensors 22 for improving the monitoring of products, that is to say the traceability thereof, and certifying the validity thereof. The sensors 22 are then formed on the receiving surface 2a of the support means 2 using the same method as that used for the production of the radio-frequency antennas 8. The sensors are produced by successive depositions of thin films of several materials on at least part of the receiving surface 2a of the support means 2 covered with the bonding coat 6.

The step of producing the sensors 22 can be performed simultaneously with the step of producing the antennas 8, or be the subject of several prior and/or subsequent steps.

Advantageously, microbatteries are formed alone or in connection with these sensors 2 on the support means 2, using the same deposition method as for the antennas and sensors 22.

Advantageously, the bonding coat 6 has particular physical properties (ferroelectric, dielectric, thermal, optical or mechanical) that may vary proportionally to the variations in an environmental physical quantity and thus interact with the sensors 22.

The radio-frequency identification elements can consequently be associated with boxes of medication or fresh products. This is because the fresh products and the pharmaceutical products (medication, vaccines, etc) and medical products (blood pouches) are stored or transported under special environmental conditions, in particular in certain temperature or pressure ranges or in certain contaminating environments that should not exceed certain threshold values. These radio-frequency identification elements can then be sized to make it possible to certify compliance with these conditions or on the contrary reveal a contravention of the storage or transport conditions.

The rolls of support means 2 comprises radio-frequency transponders, formed by the combination of the antenna 8 with the electronic chip 20, and optionally the sensors and microbatteries are then packaged in a roll of radio-frequency identification labels. These labels will then be cut into individual rolls, and then laminated and kiss cut in order to produce the radio-frequency identification elements one by one, packaged in individual rolls.

An example of a radio-frequency identification element capable of being obtained by implementing the production method described above will now be described with reference to FIGS. 2a and 2b.

This radio-frequency identification element then comprises a print support 2 provided with a receiving surface 2a and a print surface 2b. The receiving surface 2a is at least partially covered with a bonding coat 6 on which an antenna 8 connected to an electronic chip 20 is formed.

In addition, the radio-frequency identification element advantageously has a plurality of thin films formed on the receiving surface 2a covered with the bonding coat 6, forming at least one sensor 22 and/or microbatteries.

According to an embodiment that is not shown, the receiving surface 2a of the support means 2 can be self-adhesive and be covered with a protective layer having a cutout in the shape of the antenna 8 and sensors 22.

The radio-frequency identification element thus obtained makes it possible to certify compliance with the transport and storage conditions recommended for individual food or medical products. Thus each product has a radio-frequency identification element that is specific rather than common to a whole batch.

These radio-frequency identification elements that are inexpensive and thin and have sensors can be used to guarantee that each individual product has been packaged according to current standards. Thus, when no message indicating a breach is received during reading, the system guarantees that the product has been properly packaged. The conditions monitored may for example be temperature, pressure, impact, the presence of toxic gases beyond a certain threshold, etc. The radio-frequency identification elements are then applied to each product, which affords individual and uninterrupted monitoring.

The invention is not limited to the example embodiments described and shown. A person skilled in the art is in a position to implement different variants of the method of producing identification elements presented above, without departing from the scope of the invention.

The invention claimed is:

1. Method of producing at least one radio-frequency identification element-having a support means and at least one antenna on the support means, the method comprising:
    covering at least part of a receiving surface of the support means with a bonding coat intended for thermal protection of the support means; and
    depositing at least one conducting material on the receiving surface of the support means by vacuum deposition; and
    coiling the support means; wherein the thermal protection provided by the bonding coat is suitable for producing the antenna via vacuum deposition of the at least one conducting material, and the bonding coat provides adhesion between the support means and the conducting material sufficient to permit coiling of the support means immediately after depositing the at least one conducting material without requiring a drying or providing a protective means.

2. Method according to claim 1, comprising a step of printing on a print surface of the support means.

3. Method according to claim 1, in which the vacuum deposition is performed by thermal evaporation.

4. Method according to claim 1, wherein an oil is printed on the parts of the receiving surface covered with the bonding coat that are not intended to receive the conducting material.

5. Method according to claim 1, wherein the conducting material is deposited on the receiving surface covered with the bonding coat, through a screen-printing mask able to move in accordance with the movement of the support means.

6. Method according to claim 5, wherein the receiving surface is self-adhesive and protected by a pre-cut protective layer forming the screen-printing mask.

7. Method according to claim 1, wherein said at least one conducting material is made from aluminium.

8. Production method according to claim 1, wherein at least one sensor is produced by successive depositions of thin films of at least one conducting material on at least part of the receiving surface of the support means covered with the bonding coat.

9. Production method according to claim 8, wherein at least one microbattery is produced by successive depositions of thin films of at least one conducting material on at least part of the receiving surface of the support means covered with the bonding coat.

10. Production method according to claim 1, wherein at least one microbattery is produced by successive depositions of thin films of at least one conducting material on at least part of the receiving surface of the support means covered with the bonding coat.

11. Method according to claim 1, wherein the at least one conducting material is deposited in a single vacuum deposition step.

12. Radio-frequency identification element, comprising a support means and at least one antenna made from a conducting material on the support means, wherein the support means comprises a receiving surface at least partially covered with a bonding coat thermally protecting the support means on which the antenna is formed, and the support means is coiled, wherein the thermal protection provided by the bonding coat is suitable for producing the at least one antenna via vacuum deposition of the at least one conducting material, and wherein the bonding coat provides adhesion between the support means and the conducting material sufficient to permit coiling of the support means immediately after depositing the at least one conducting material without requiring drying or providing a protective means.

13. Radio-frequency identification element according to claim 12, wherein the support means is printable.

14. Radio-frequency identification element according to claim 13, wherein the bonding coat has physical properties for interacting with the sensor.

15. Radio-frequency identification element according to claim 14, also comprising at least one microbattery having thin films of at least one conducting material formed on the receiving surface at least partially covered with the bonding coat.

16. Radio-frequency identification element according to claim 12, wherein the bonding coat is a varnish.

17. Radio-frequency identification element according to claim 12, wherein the bonding coat is self-adhesive and covered with a pre-cut protective layer constituting a screen-printing mask to the shape of the antenna.

18. Radio-frequency identification element according to claim 12, also comprising at least one sensor having thin films of at least one conducing material formed on the receiving surface at least partially covered with the bonding coat.

19. Radio-frequency identification element according to claim 12, also comprising at least one microbattery having thin films of at least one conducting material formed on the receiving surface at least partially covered with the bonding coat.

20. Use of radio-frequency identification elements, in particular according to any one of claims 12 to 19, for certifying compliance with the standards for packaging individual food products.

21. Use of radio-frequency identification elements, in particular according to any one of claims 12 to 19, for certifying compliance with the standards for packaging individual medical products.

22. Radio-frequency identification element according to claim 12, wherein the bonding coated provides thermal protection suitable for producing the at least one antenna via a single vacuum deposition of the at least one conducting material.

23. Method of producing at least one radio-frequency identification element-having a support means and at least one antenna on the support means, the method consisting of:

covering at least part of a receiving surface of the support means with a bonding coat intended for thermal protection of the support means; and depositing at least one conducting material on the receiving surface of the support means by vacuum deposition; wherein the thermal protection provided by the bonding coat is suitable for producing the antenna via vacuum deposition of the at least one conducting material.

24. Method according to claim 23, wherein the depositing the at least one conducting material comprises depositing the at least one conducting material in a single vacuum deposition step.

25. Radio-frequency identification element, consisting of a support means and at least one antenna made from a conducting material on the support means, wherein the support means comprises a receiving surface at least partially covered with a bonding coat thermally protecting the support means on which the antenna is formed, and whereby the thermal protection provided by the bonding coat is suitable for producing the at least one antenna via vacuum deposition of the at least one conducting material.

26. Radio-frequency identification element according to claim 25, wherein the thermal protection provided by the bonding coat is suitable for producing the at least one antenna via a single vacuum deposition of the at least one conducting material.

* * * * *